(12) United States Patent
Kitamura

(10) Patent No.: US 7,033,222 B2
(45) Date of Patent: Apr. 25, 2006

(54) CARD-RECEIVING DEVICE

(75) Inventor: Masanori Kitamura, Ibaraki (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 11/047,736

(22) Filed: Feb. 2, 2005

(65) Prior Publication Data

US 2005/0181674 A1   Aug. 18, 2005

(30) Foreign Application Priority Data

Feb. 13, 2004 (JP) .......................... P2004-036215

(51) Int. Cl.
*H01R 24/00* (2006.01)
(52) U.S. Cl. ..................... 439/630; 439/862
(58) Field of Classification Search ................ 439/630, 439/137, 138, 862, 374, 385
See application file for complete search history.

(56) References Cited

U.S. PATENT DOCUMENTS

| | | | | |
|---|---|---|---|---|
| 4,904,852 A | * | 2/1990 | Mita et al. ................ | 235/479 |
| 6,033,253 A | * | 3/2000 | Yi et al. ..................... | 439/377 |
| 6,102,715 A | * | 8/2000 | Centofante ................ | 439/140 |
| 6,203,378 B1 | * | 3/2001 | Shobara et al. ........... | 439/638 |
| 6,264,483 B1 | * | 7/2001 | Wilson ....................... | 439/137 |
| 6,356,456 B1 | * | 3/2002 | Eskildsen ................... | 361/801 |
| 6,399,906 B1 | * | 6/2002 | Sato et al. ................. | 200/61.59 |

FOREIGN PATENT DOCUMENTS

JP   2000-150078   5/2000

* cited by examiner

*Primary Examiner*—P. Austin Bradley
*Assistant Examiner*—Phuongchi Nguyen
(74) *Attorney, Agent, or Firm*—Rader, Fishman & Grauer PLLC; Ronald P. Kananen

(57) ABSTRACT

A card-receiving device for receiving a card having a plurality of terminal electrodes at an end in the insertion direction includes a loading slot for the card, a plurality of connecting terminals respectively connected to the terminal electrodes of the card, a reference plane against which one surface of the card in the thickness direction is pressed, a height-adjusting section pressed against the other surface of the card in the thickness direction, and first biasing means for biasing the height-adjusting section toward the reference plane.

10 Claims, 12 Drawing Sheets

CARD-RECEIVING DEVICE

BACKGROUND OF THE INVENTION

1. Field of the Invention

The present invention relates to card-receiving devices, and, in particular, to card-receiving devices to which cards having different outer dimensions can be loaded. The card-receiving devices have simplified structures and improved usability.

2. Description of the Related Art

Cards to be loaded may include a memory card provided with a semiconductor memory and capable of recording data and an extension card attached to electronic apparatuses for extending functions thereof, for example.

As disclosed in Japanese Unexamined Patent Application Publication No. 2000-150078, such cards are inserted from loading slots of personal computers, information terminals, dedicated devices for the cards, or the like, and loaded in, for example, card connectors provided in card-receiving devices.

When such cards are loaded from the loading slots of the card-receiving devices, both sides of each card are guided by a pair of guiding portions provided thereon, and terminal electrodes of the cards are connected to respective connecting terminals of the card connectors. In this manner, the cards are loaded into the card connectors.

Nowadays, various types of cards having different storage capacities, different shapes, and different dimensions are in widespread use. To improve their usability, card-receiving devices to which cards having different outer dimensions can be loaded are also in use.

One such card-receiving device includes common connecting terminals for two cards having different outer dimensions. Both of these cards can be loaded in the card-receiving device by attaching an adaptor to the smaller card such that the outer dimension of the smaller card is virtually identical to the outer dimension of the larger card and by connecting either of the cards to the common connecting terminals.

However, as described above, the smaller card requires the adaptor whenever it is loaded in the card-receiving device. This is inconvenient.

Another example of a card-receiving device for two cards having different outer dimensions includes a first loading path for the larger card and a second loading path for the smaller card inside the card-receiving device. The terminal electrodes of the larger card inserted from a loading slot through the first loading path are connected to first connecting terminals, and the terminal electrodes of the smaller card inserted from the same loading slot through the second loading path are connected to second connecting terminals.

However, in this case, the card-receiving device must have two loading paths, and the connecting terminals must be formed both on the first and second loading paths. This causes a larger device and an increase in the number of parts. Moreover, a guiding mechanism for guiding the card to the first loading path or the second loading path depending on the difference in the outer dimension is also required. Thus, the structure of the device is complicated, in addition to the upsizing of the device and the increase in the number of parts.

SUMMARY OF THE INVENTION

Accordingly, it is an object of the present invention to provide a card-receiving device having simplified structures and improved usability.

According to a first aspect of the present invention, a card-receiving device for receiving a card having a plurality of terminal electrodes at an end in the insertion direction includes a loading slot for the card, a plurality of connecting terminals respectively connected to the terminal electrodes of the card, a reference plane against which one surface of the card in the thickness direction is pressed, a height-adjusting section pressed against the other surface of the card in the thickness direction, and first biasing means for biasing the height-adjusting section toward the reference plane.

In the card-receiving device according to the first aspect of the present invention, one side of the card in the thickness direction is pressed against the reference plane as the height-adjusting section is pressed against the other surface of the card.

Therefore, a plurality of cards having different thicknesses can be loaded in the card-receiving device without attaching an adaptor to the thinner cards. This improves the usability of the card-receiving device.

Furthermore, the cards are inserted into the same path and connected to the common connecting terminals. Accordingly, the usability of the card-receiving device can be improved even with fewer numbers of parts and simplified mechanisms.

According to a second aspect of the present invention, the device includes a pair of width-adjusting sections pressed against respective side faces of the card in the width direction orthogonal to both the thickness direction and the insertion direction of the card, second biasing means for biasing the width-adjusting sections so as to be close to each other, and positioning means for positioning the terminal electrodes of the card with respect to the connecting terminals in the width direction. Therefore, a variety of cards having different widths can be loaded in the card-receiving device without attaching an adaptor to the narrower cards. This improves the usability of the card-receiving device.

According to a third aspect of the present invention, the device includes a guiding section extending from the height-adjusting section for guiding the inserted card from the loading slot toward the connecting terminals. Accordingly, the card is reliably guided to the connecting terminals.

According to a fourth aspect of the present invention, the device includes a guiding section extending from each of the width-adjusting sections for guiding the inserted card from the loading slot toward the connecting terminals. Accordingly, the card is reliably guided to the connecting terminals.

According to a fifth aspect of the present invention, the device is characterized in that the height-adjusting section and the first biasing means are integrated together. Accordingly, the number of parts can be reduced.

According to a sixth aspect of the present invention, the device is characterized in that the width-adjusting sections and the second biasing means are integrated together. Accordingly, the number of parts can be reduced.

According to a seventh aspect of the present invention, the card-receiving device for receiving a card having a plurality of terminal electrodes at an end in the insertion direction includes a loading slot for the card, a plurality of connecting terminals respectively connected to the terminal electrodes of the card, a pair of width-adjusting sections pressed against respective side faces of the card in the width direction orthogonal to both the thickness direction and the insertion direction of the card, second biasing means for biasing the width-adjusting sections so as to be close to each other, and positioning means for positioning the terminal electrodes of the card with respect to the connecting terminals in the width direction.

In the card-receiving device according to the seventh aspect of the present invention, the width-adjusting sections are pressed against the respective side faces of the card in the width direction while the terminal electrodes of the card are positioned with respect to the connecting terminals.

Therefore, a plurality of cards having different widths can be loaded in the card-receiving device without attaching an adaptor to the narrower cards. This improves the usability of the card-receiving device.

Furthermore, the cards are inserted into the same path and connected to the common connecting terminals. Accordingly, the usability of the card-receiving device can be improved even with fewer numbers of parts and simplified mechanisms.

According to an eighth aspect of the present invention, the device includes a reference plane against which one surface of the card in the thickness direction is pressed, a height-adjusting section pressed against the other surface of the card in the thickness direction, and first biasing means for biasing the height-adjusting section toward the reference plane. Therefore, a variety of cards having different thicknesses can be loaded in the card-receiving device without attaching an adaptor to the thinner cards. This improves the usability of the card-receiving device.

According to a ninth aspect of the present invention, the device includes a guiding section extending from each of the width-adjusting sections for guiding the inserted card from the loading slot toward the connecting terminals. Accordingly, the card is reliably guided to the connecting terminals.

According to a tenth aspect of the present invention, the device includes a guiding section extending from the height-adjusting section for guiding the inserted card from the loading slot toward the connecting terminals. Accordingly, the card is reliably guided to the connecting terminals.

According to an eleventh aspect of the present invention, the device is characterized in that the width-adjusting sections and the second biasing means are integrated together. Accordingly, the number of parts can be reduced.

According to a twelfth aspect of the present invention, the device is characterized in that the height-adjusting section and the first biasing means are integrated together. Accordingly, the number of parts can be reduced.

DESCRIPTION OF THE PREFERRED EMBODIMENT

A preferred embodiment of the card-receiving device of the present invention will now be described with reference to the drawings. The card-receiving device according to the following preferred embodiment of the present invention can be connected to, for example, an information processor, such as a personal computer, and can be used for transferring data between the loaded card and the information processor.

The application of the present invention is not limited to such card-receiving devices. The present invention is also widely applicable to card-receiving devices that hold cards inserted and loaded therein and that are attached to various electronic apparatus, for example, information processors such as personal computers; communication apparatuses typified by telephones and facsimiles; information terminals such as personal digital assistants (PDAs); imaging apparatuses such as still cameras, electron cameras, and video cameras; audiovisual apparatuses such as televisions and radios; reading and writing apparatuses dealing with recording media such as recording disks and cassette tapes; and sound systems.

First, with reference to FIGS. 1 to 3, cards inserted and loaded in a card-receiving device will now be described.

The cards may include a memory card provided with a semiconductor memory and capable of recording data and an extension card attached to electronic apparatuses for extending functions thereof, for example. The extension card may be loaded in, for example, information terminals such as PDAs to add functions of, for example, a camera, a navigational system, and communication.

Figure 1:
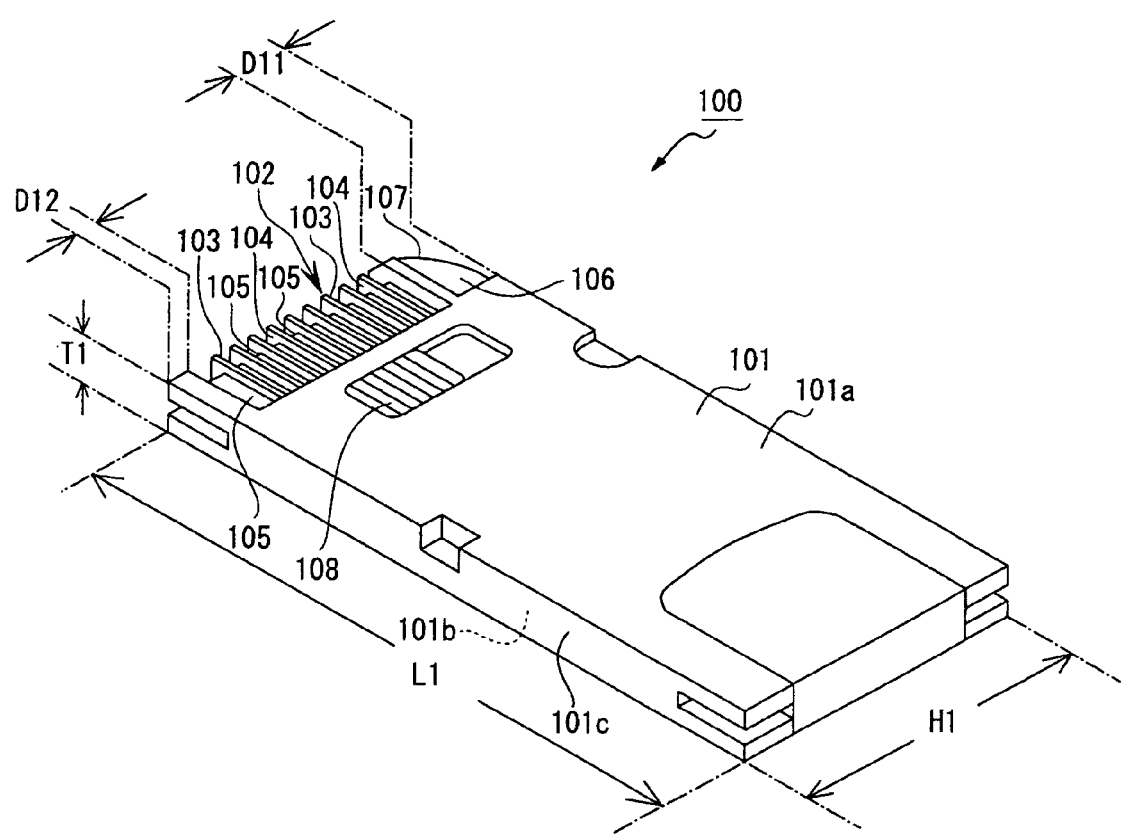
FIG. 1 is an enlarged perspective view illustrating a first card loaded in a card-receiving device according to an embodiment of the present invention.
Figure 2:
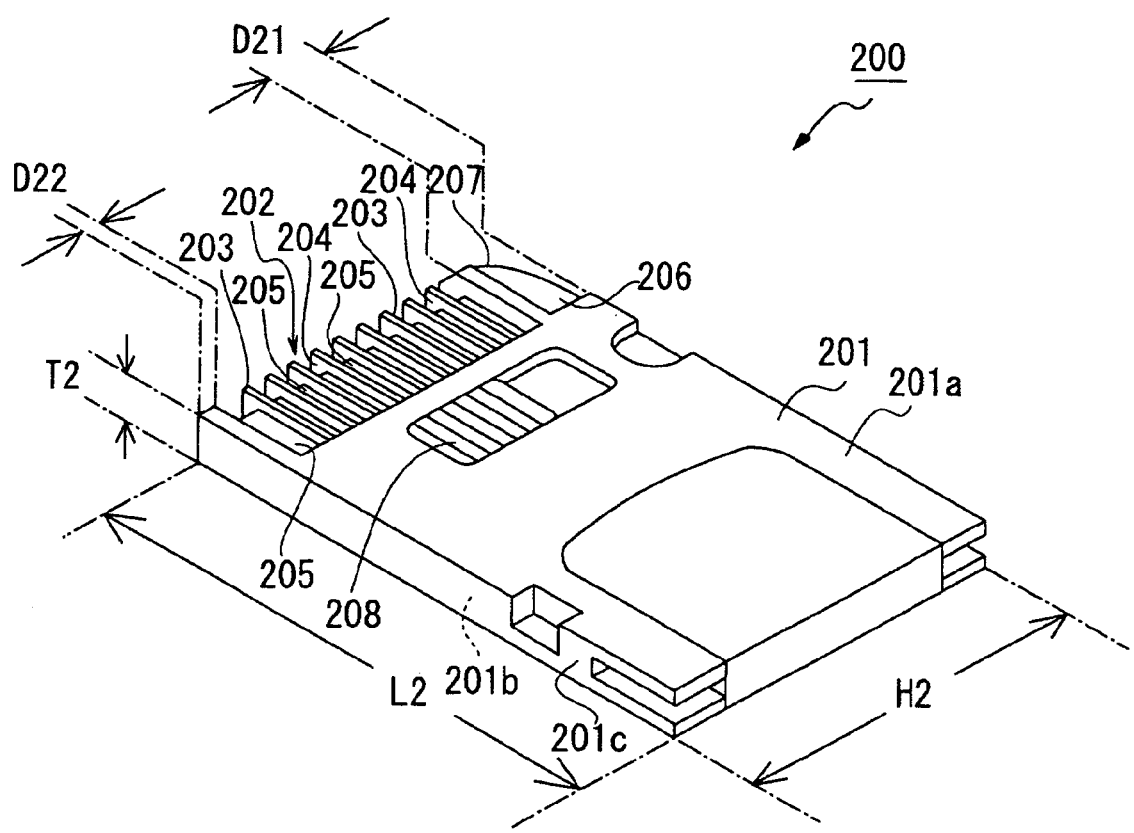
FIG. 2 is an enlarged perspective view illustrating a second card loaded in the card-receiving device.
Figure 3:
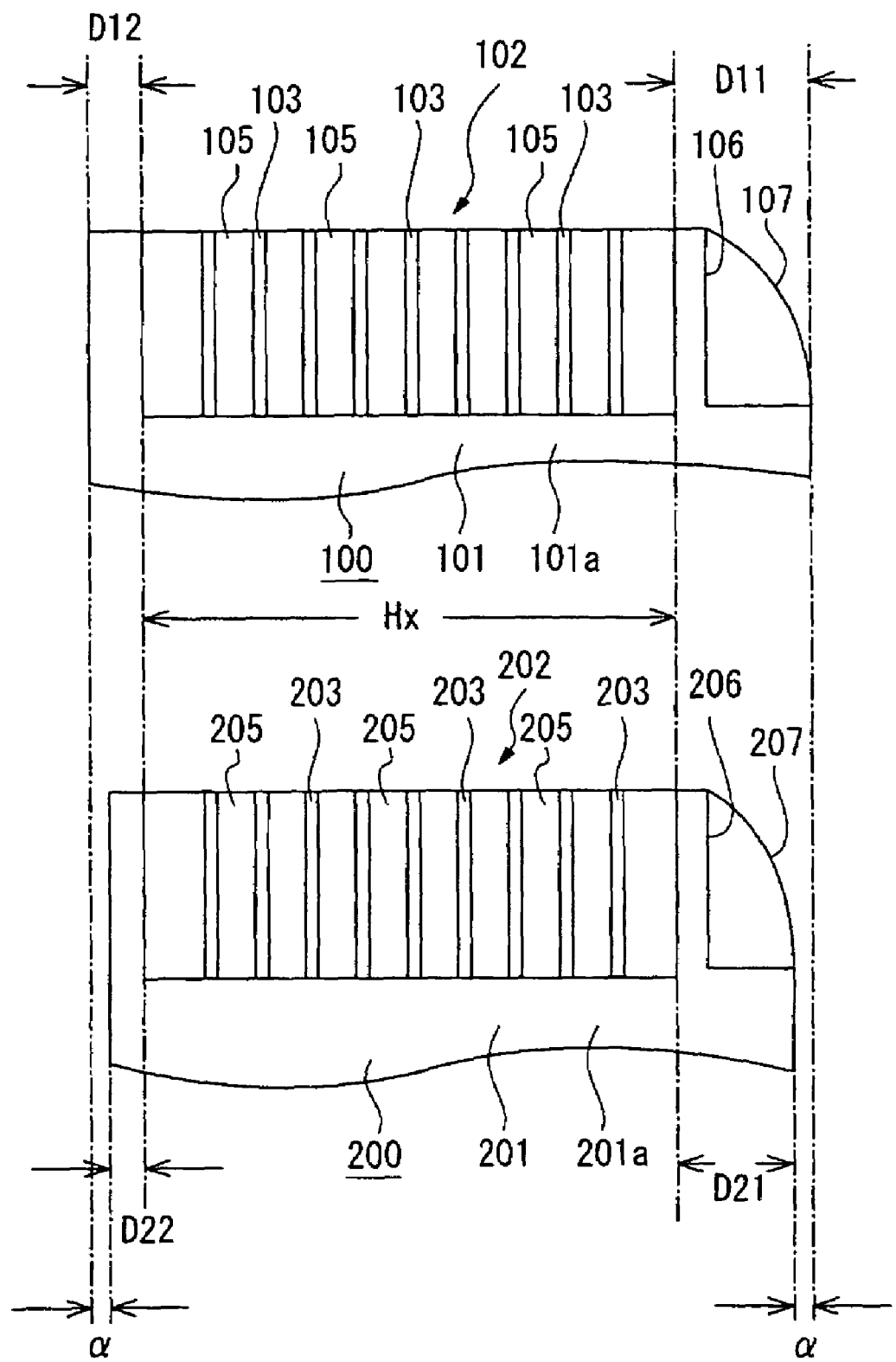
FIG. 3 is an enlarged rear elevation view illustrating the difference in width between the first card and the second card.

Different types of cards having different outer dimensions, i.e. length, width, and thickness, for example, a first card 100 shown in FIG. 1 and a second card 200 shown in FIG. 2, are loaded in the card-receiving device. The lengths of the first card 100 and the second card 200 herein are defined as the sizes in the direction along which the cards are inserted in the card-receiving device.

As shown in FIG. 1, the first card 100 is an approximately rectangular plate having dimensions of, for example, 50 mm long (L1)×21.5 mm wide (H1)×2.8 mm thick (T1).

The first card 100 includes a semiconductor memory, such as a flash memory, in a casing 101 thereof. The casing 101 includes a first main surface 101a having the largest area and a second main surface 101b opposing the first main surface 101a.

The first main surface 101a has an electrode portion 102 at an end thereof in the longitudinal direction. Ten connecting grooves 104 separated by partition plates 103 disposed at regular intervals are formed in the electrode portion 102 in the width direction of the first main surface 101a. The connecting grooves 104 are open to one side (rearward) in the longitudinal direction of the first main surface 101a and to one side (upward) in the thickness direction of the first card 100. Terminal electrodes 105 are respectively disposed in the connecting grooves 104.

A cut-out portion 106 is open upward at one side of the first card 100 adjacent to the electrode portion 102. The outer edge of the cut-out portion 106, or a chamfer 107, is approximately arch-shaped.

A slidable write-protect switch 108 is disposed on the first main surface 101a adjacent to the electrode portion 102. The write-protect switch 108 positioned at one side allows writing of data to the semiconductor memory, whereas the write-protect switch positioned at the other side prevents writing of data to the semiconductor memory.

As shown in FIG. 2, the second card 200 is approximately rectangular and has dimensions smaller than that of the first card 100. The dimensions are, for example, 31 mm long (L2)×20 mm wide (H2)×1.6 mm thick (T2).

The second card 200 has an electrode portion 202, in common with the electrode portion 102 of the first card 100, on a first main surface 201a. Partition plates 203 are disposed at the same intervals as the partition plates 103.

The second card 200 includes elements similar to those in the first card 100. The second card 200 includes connecting grooves 204 and terminal electrodes 205 respectively disposed in the connecting grooves 204. The second card 200 further includes a cut-out portion 206, chamfer 207, and a write-protect switch 208 in a casing 201 thereof.

The electrode portion 202 of the second card 200 has the same width (Hx shown in FIG. 3) as the electrode portion 102 of the first card 100. However, as shown in FIG. 3, the distance D21 between the right end of the rightmost terminal electrode 205 of the second card 200 and the right side face 201c of the casing 201 is slightly shorter than the distance D11 between the right end of the rightmost terminal electrode 105 of the first card 100 and the right side face 101c of the casing 101. In addition, the distance D22 between the left end of the leftmost terminal electrode 205 of the second card 200 and the left side face 201c of the casing 201 is slightly shorter than the distance D12 between the left end of the leftmost terminal electrode 105 of the first card 100 and the left side face 101c of the casing 101.

The distance D11 of the first card 100 is longer than the distance D21 of the second card 200 by α, and the distance D12 of the first card 100 is also longer than the distance D22 of the second card 200 by α.

The distance in the thickness direction between the first main surface 101a of the first card 100 and each of the terminal electrodes 105 is longer than that between the first main surface 201a of the second card 200 and each of the terminal electrodes 205. The distance in the thickness direction between the second main surface 101b of the first card 100 and each of the terminal electrodes 105 is the same as that between a second main surface 201b of the second card 200 and each of the terminal electrodes 205.

Second, with reference to FIGS. 4 to 6, a card-receiving device to which the first card 100 or the second card 200 is loaded will now be described.

Figure 4:
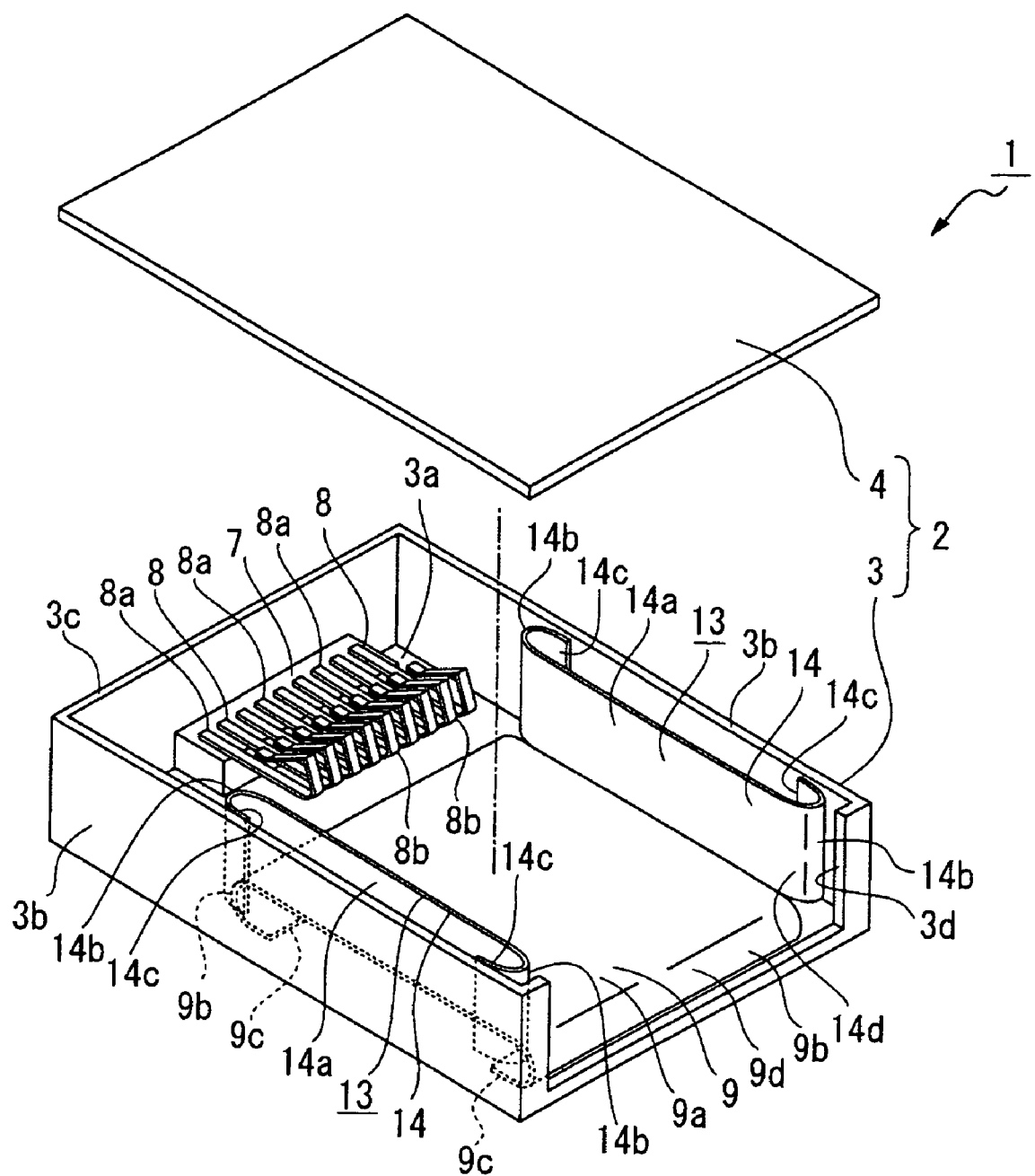
FIG. 4 is a perspective view of the card-receiving device when a cover plate is detached.

As shown in FIG. 4, a card-receiving device 1 includes required components in a housing 2 thereof.

The housing 2 consists of a body 3 open upward and forward and a cover plate 4. As shown in FIGS. 4 and 5, the body 3 consists of a bottom plate 3a, side plates 3b, a rear plate 3c, and a front frame 3d. The body 3 and the cover plate 4 attached thereto so as to cover the upside aperture of the body 3 form the housing 2, and the front frame 3d of the body 3 and the front end of the cover plate 4 form a loading slot 2a in front of the housing 2 as shown in FIG. 6.

Figure 5:
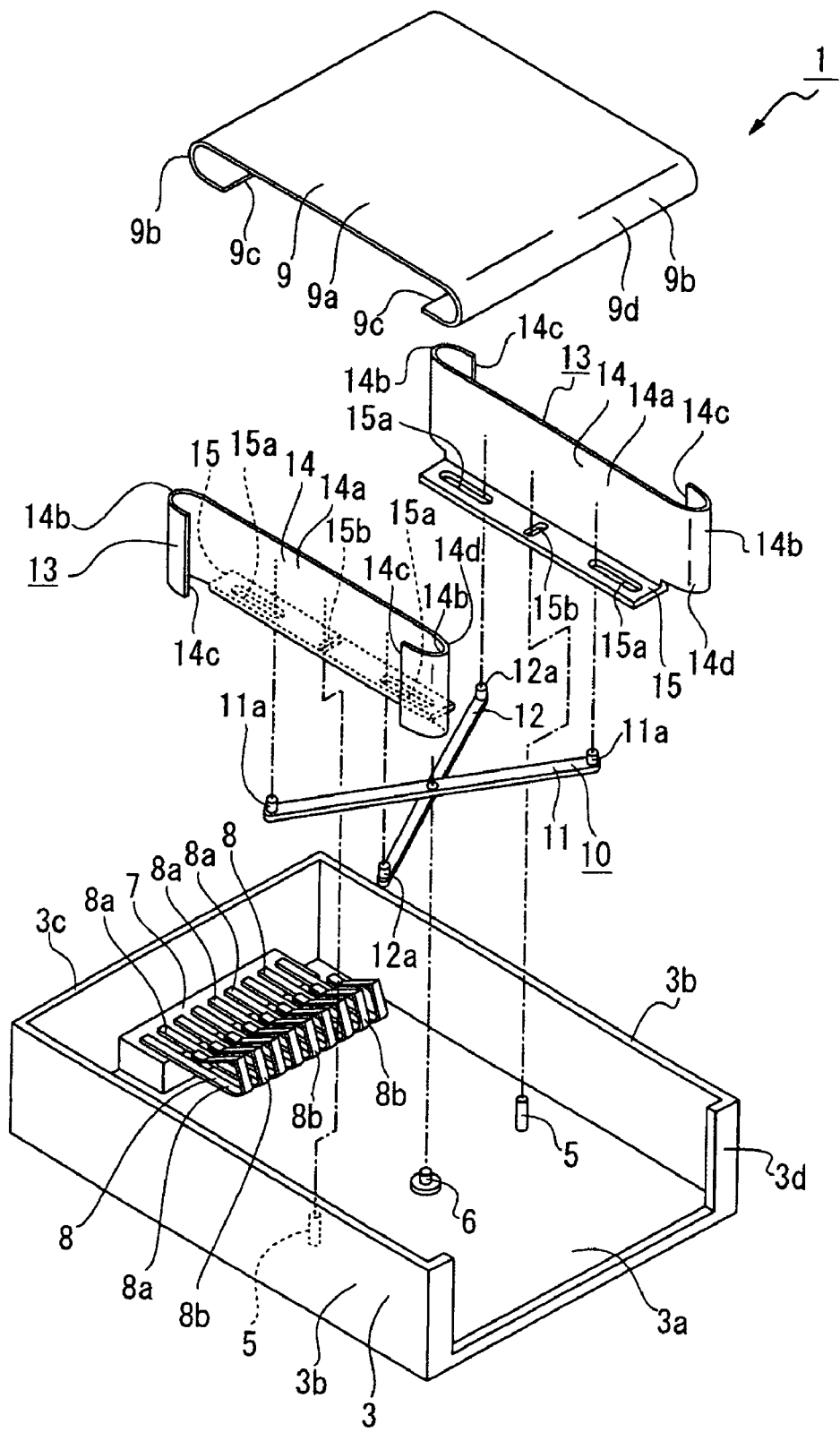
FIG. 5 is an exploded perspective view of the card-receiving device when the cover plate is removed.

As shown in FIG. 5, the bottom plate 3a of the body 3 includes two guide pins 5 protruding upward therefrom and separated by a certain spacing in the transverse direction and a supporting pin 6 protruding upward therefrom and disposed at the midpoint of the guide pins 5.

The cover plate 4 is defined as a reference plane, and the second main surface 101b and the second main surface 201b are pressed against the reference plane when the first card 100 or the second card 200 is fitted in the housing 2.

A mounting substrate 7 is disposed at the rear portion of the housing 2. The rear end of the mounting substrate 7 is connected to a connector (not shown) disposed on the outside of the rear plate 3c. The connector is connected to, for example, a connector of an information processor, such as a personal computer.

A plurality of connecting terminals 8 is disposed on the mounting substrate 7 in the width direction of the card-receiving device 1 at the same intervals as the terminal electrodes 105 of the first card 100 and the terminal electrodes 205 of the second card 200. The width of each connecting terminal 8 in the width direction is narrower than that of each terminal electrode 105 or terminal electrode 205 in the width direction.

The connecting terminals 8 each include a long base section 8a attached to the mounting substrate 7 and a contact section 8b formed by turning the front portion of the base section 8a up. The contact section 8b has an inversed V shape when viewed from the side. The contact section 8b is elastically deformable toward the base section 8a.

A height adjuster 9 is disposed on the bottom plate 3a of the housing 2. The height adjuster 9 is a spring plate having a predetermined profile. The height adjuster 9 includes a height-adjusting section 9a facing the cover plate 4, spring sections 9b extending from the front end and the rear end of the height-adjusting section 9a and each having an approximately semicircular shape curved outward when viewed from the side, and supporting sections 9c extending from the ends of the spring sections 9b on the other sides of the height-adjusting section 9a. The supporting sections 9c are in contact with the bottom plate 3a. The spring sections 9b function as biasing means for biasing the height-adjusting section 9a upward. The upper portion of the front supporting section 9c is defined as a guiding section 9d. The vertical position of the rear portion of the guiding section 9d is higher than that of the front portion.

When no load is applied to the height adjuster 9 from the upside, the gap between the top surface of the height-adjusting section 9a and the bottom surface of the cover plate 4 is slightly smaller than the thickness of the second card 200.

When a load is applied on the height-adjusting section 9a from the upside, the spring sections 9b elastically deform and the height-adjusting section 9a moves toward the bottom plate 3a. When the load applied to the height-adjusting section 9a is released, the spring sections 9b restore and the height-adjusting section 9a moves so as to be remote from the bottom plate 3a.

Figure 6:
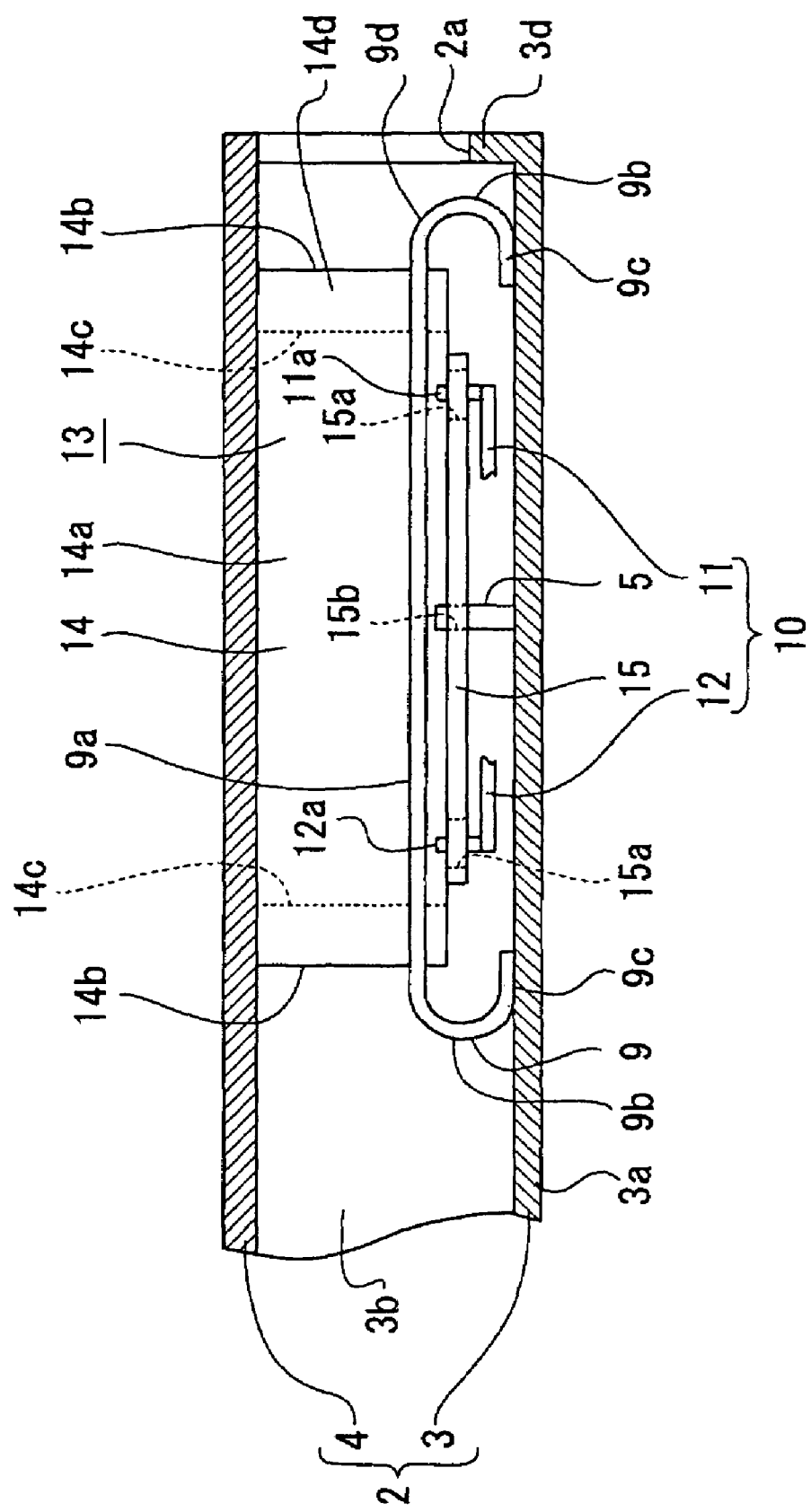
FIG. 6 is an enlarged cross-sectional view partly illustrating the card-receiving device.

As shown in FIGS. 5 and 6, a centering mechanism 10 is supported inside the housing 2. The centering mechanism 10 is a positioning means for positioning the terminal electrodes 105 of the first card 100 and the terminal electrodes 205 of the second card 200 with respect to the connecting terminals 8 in the width direction. The centering mechanism 10 includes a first link 11 and a second link 12. The first link 11 and the second link 12 intersect each other at their centers in the longitudinal direction and are rotatably supported on the supporting pin 6 disposed on the bottom plate 3a. The first link 11 and the second link 12 have engaging pins 11a and 12a, respectively, protruding upward from both ends in the longitudinal direction.

Width adjusters 13 are supported at the left side and the right side in the housing 2. The width adjusters 13 each include a width-adjusting portion 14 disposed along the inner surface of one side plate 3b of the body 3 and a base portion 15 extending from the lower edge of the width-adjusting portion 14 to the center of the housing 2.

The width-adjusting portion 14 is a spring plate having a predetermined profile. The width-adjusting portion 14 includes a long width-adjusting section 14a facing the sides plates 3b, spring sections 14b extending from the front end and the rear end of the width-adjusting section 14a and each having an approximately semicircular shape curved outward when viewed from the top, and supporting sections 14c extending from the ends of the spring sections 14b on the other sides of the width-adjusting section 14a. The supporting sections 14c are in contact with one of the side plates 3b. The spring sections 14b function as biasing means for biasing the width-adjusting section 14a so as to move close to the other width-adjusting section 14a. The inner portion of the front supporting section 14c is defined as a guiding section 14d. The horizontal position of the rear portion of the guiding section 14d is arranged inward compared to that of the front portion.

The base portion 15 has engaging slits 15a open along the longitudinal direction and remote from each other. The base portion 15 also has a guiding slit 15b open along the width direction and bored at the midpoint between the engaging slits 15a.

The engaging pins 11a of the first link 11 and the engaging pins 12a of the second link 12 engage with the respective engaging slits 15a of the base portions 15 so as to be slidable. Moreover, the guide pins 5 disposed on the bottom plate 3a of the body 3 engage with the respective guiding slits 15b of the base portions 15 so as to be slidable.

When no loads are applied to the width-adjusting portions 14 of the width adjusters 13 from the inside, the gap between the inner surfaces of the width-adjusting sections 14a is slightly smaller than the width of the second card 200.

When loads are applied on the width-adjusting sections 14a from the inside, the spring sections 14b elastically deform and the width-adjusting sections 14a move toward the respective side plates 3b. When the loads applied to the width-adjusting sections 14a are released, the spring sections 14b restore and the width-adjusting sections 14a move so as to be remote from the respective side plates 3b.

Since the engaging pins 11a and 12a slidably engage with the engaging slits 15a and the guide pins 5 slidably engage with the guiding slits 15b, the engaging pins 11a and 12a slide inside the engaging slits 15a to rotate the first link 11 and the second link 12 around the supporting pin 6. Thus, the width adjusters 13 are synchronously guided so as to be separated from or moved close to each other.

With reference to FIGS. 7 to 12, operations of the card-receiving device 1 will now be described. The first card 100 or the second card 200 is inserted into the loading slot 2a from the end with the electrode portion 102 or the electrode portion 202 while the first main surface 101a or the first main surface 201a faces downward.

First, operations when the first card 100 is inserted will be described with reference to FIGS. 7 to 10.

Figure 7:
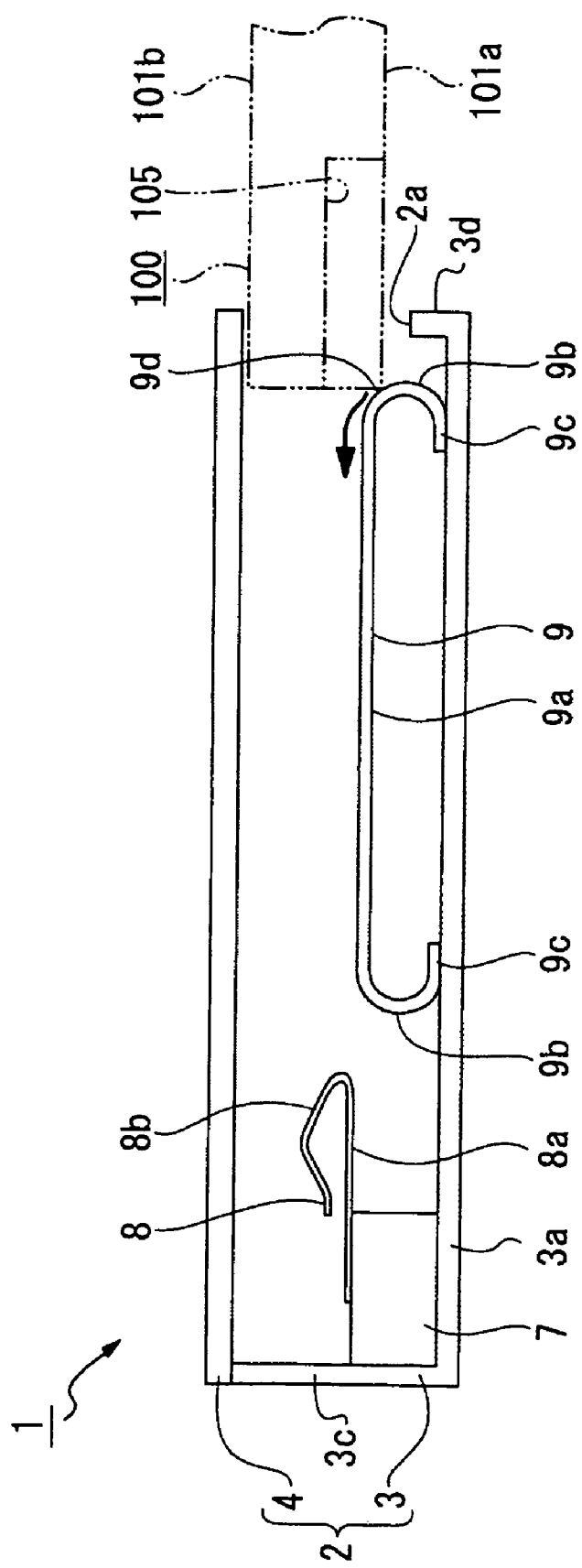
FIG. 7 is a schematic side view of the first card while the card is being inserted.
Figure 8:
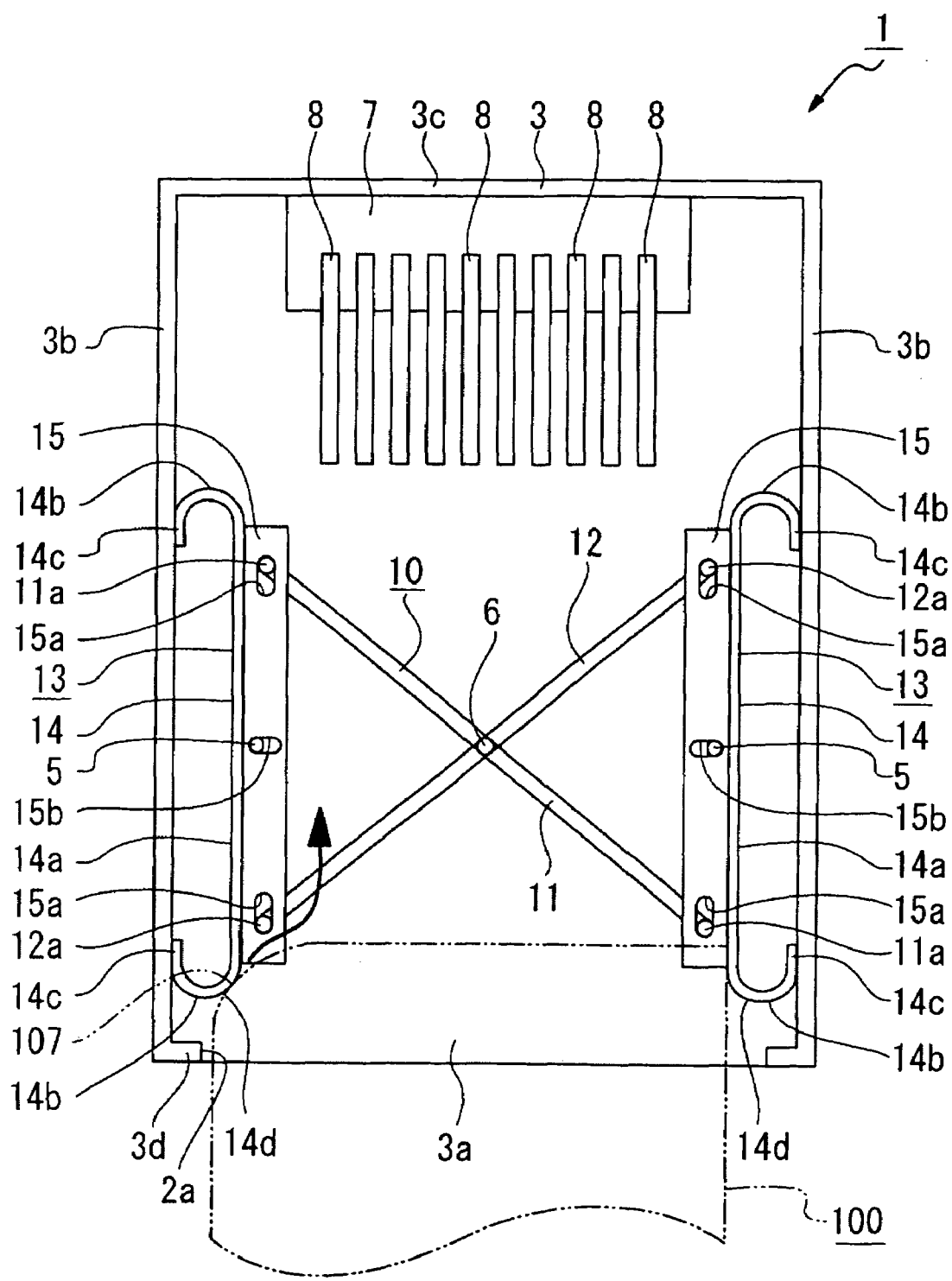
FIG. 8 is a schematic plan view of the first card while the card is being inserted.

When the first card 100 is inserted into the loading slot 2a, the first main surface 101a is guided rearward by the guiding section 9d of the height adjuster 9 (as shown in FIG. 7), and the side faces 101c also are guided rearward by the guiding sections 14d of the width adjusters 13 (as shown in FIG. 8).

Figure 9:
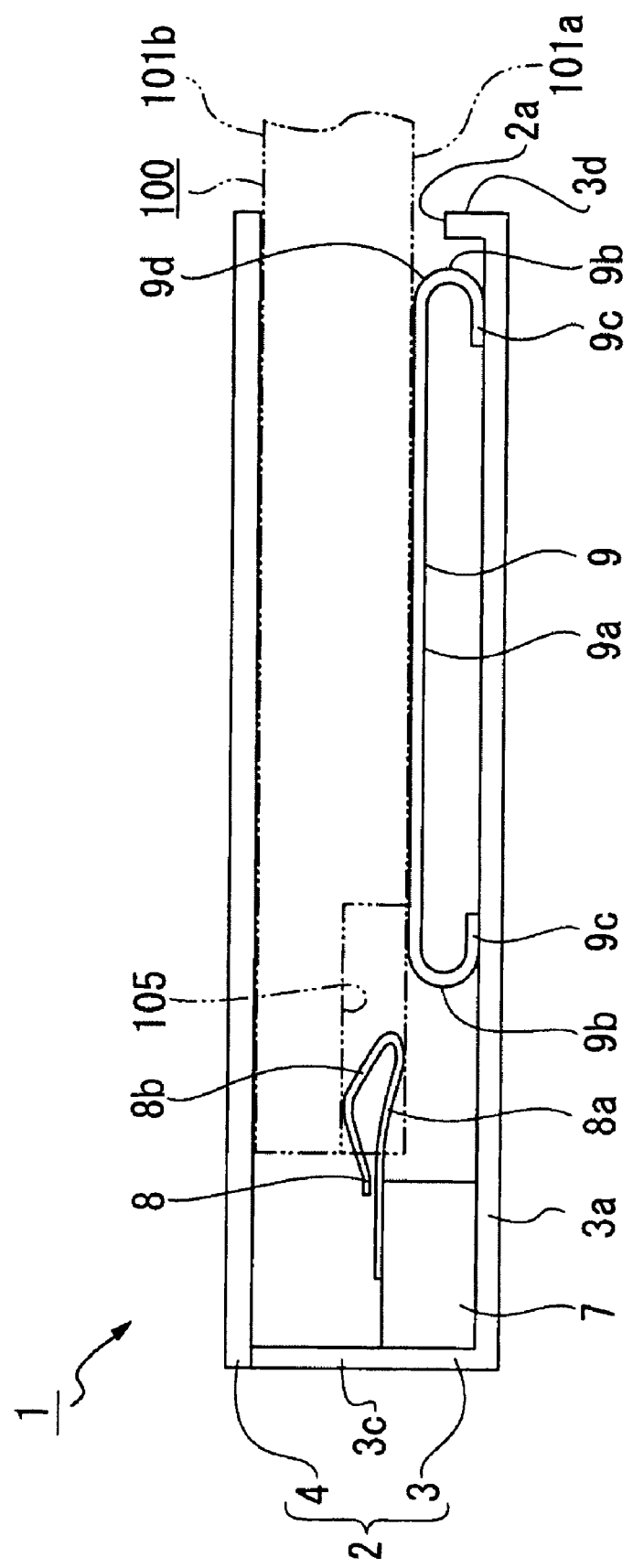
FIG. 9 is a schematic side view of the first card when the card insertion is completed.

As shown in FIG. 9, when the first card 100 moves rearward, the spring sections 9b of the height adjuster 9 elastically deform to press the height-adjusting section 9a against the first main surface 101a of the first card 100. Accordingly, the height-adjusting section 9a is urged to the first main surface 101a such that the first card 100 is slidable, and the second main surface 101b is urged to the cover plate 4 such that the first card 100 is slidable. As a result, the first card 100 is positioned appropriately in the thickness direction while the first card 100 moves rearward.

Figure 10:
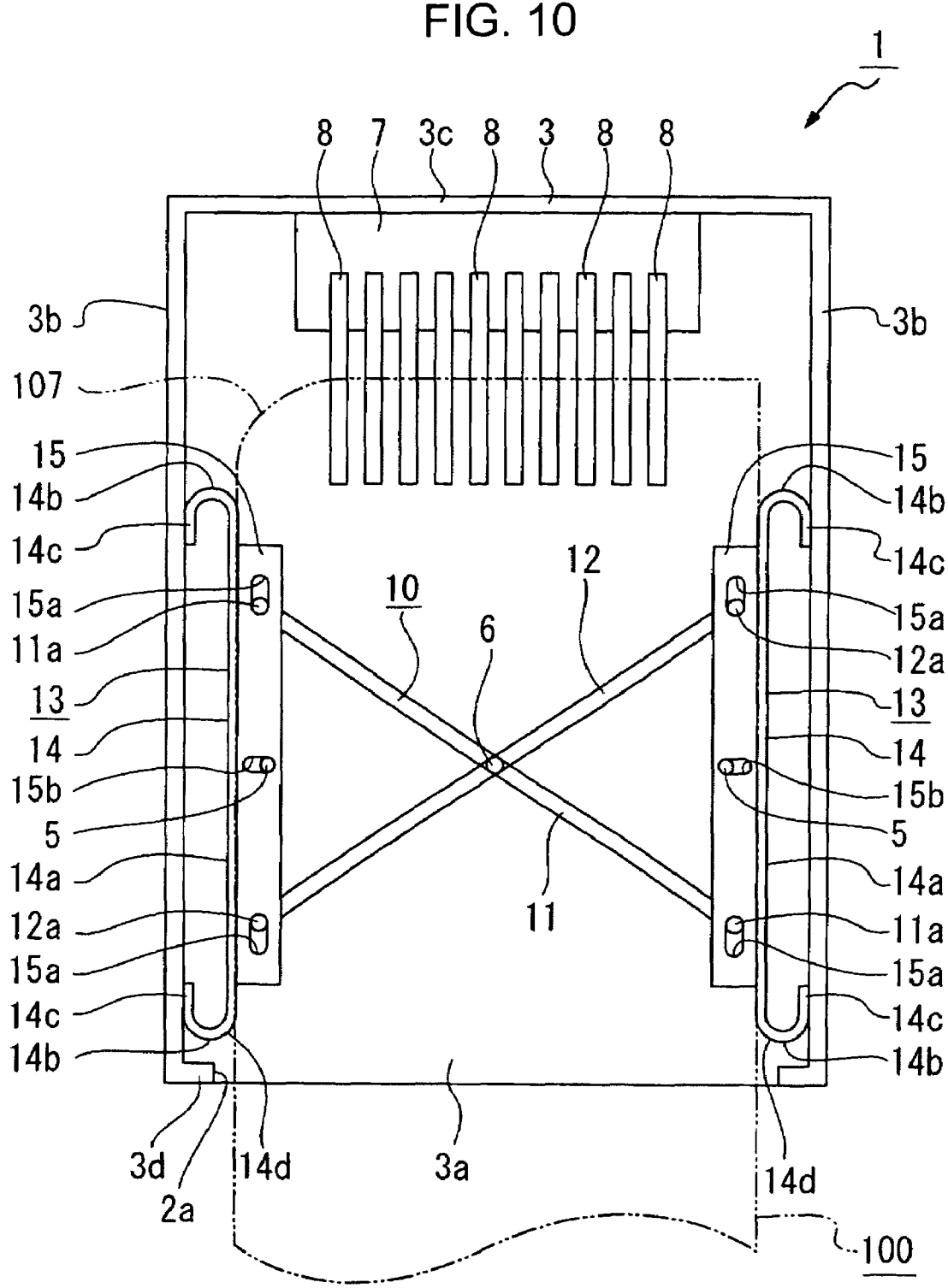
FIG. 10 is a schematic plan view of the first card when the card insertion is completed.

At the same time, as shown in FIG. 10, the spring sections 14b of the width adjusters 13 elastically deform to press the width-adjusting sections 14a against the respective side faces 101c of the first card 100. Accordingly, the width-adjusting sections 14a are urged to the respective side faces 101c such that the first card 100 is slidable. As a result, the first card 100 is appropriately positioned in the width direction while the first card 100 moves rearward. At this time, the width-adjusting portions 14 of the width adjusters 13 are disposed remotely from the supporting pin 6 by the centering mechanism 10 such that the distances in the width direction between each of the width-adjusting portions 14 and the supporting pin 6 are the same. Thus, the first card 100 is centered.

As shown in FIG. 9, when the first card 100 further moves rearward, the terminal electrodes 105 are connected to the respective connecting terminals 8 lying ahead. Since the connecting terminals 8 are elastically deformable, the terminal electrodes 105 are elastically brought into contact with the contact section 8b. This ensures the secure connection between the terminal electrodes 105 and the connecting terminals 8.

The first card 100 can be ejected by, for example, holding part of the first card 100 protruding forward from the loading slot 2a and pulling the first card 100 out. When the first card 100 is ejected, the connecting terminals 8 restore to the original position (as shown in FIG. 7), and the height-adjusting section 9a and the width-adjusting sections 14a also restore to the original position (as shown in FIGS. 7 and 8) due to the restoration of the spring sections 9b of the height adjuster 9 and the spring sections 14b of the width adjusters 13.

Second, operations when the second card 200 is inserted will be described with reference to FIGS. 11 to 12.

When the second card 200 is inserted into the loading slot 2a, the first main surface 201a is guided rearward by the guiding section 9d of the height adjuster 9, and the side faces 201c are also guided rearward by the guiding sections 14d of the width adjusters 13.

Figure 11:
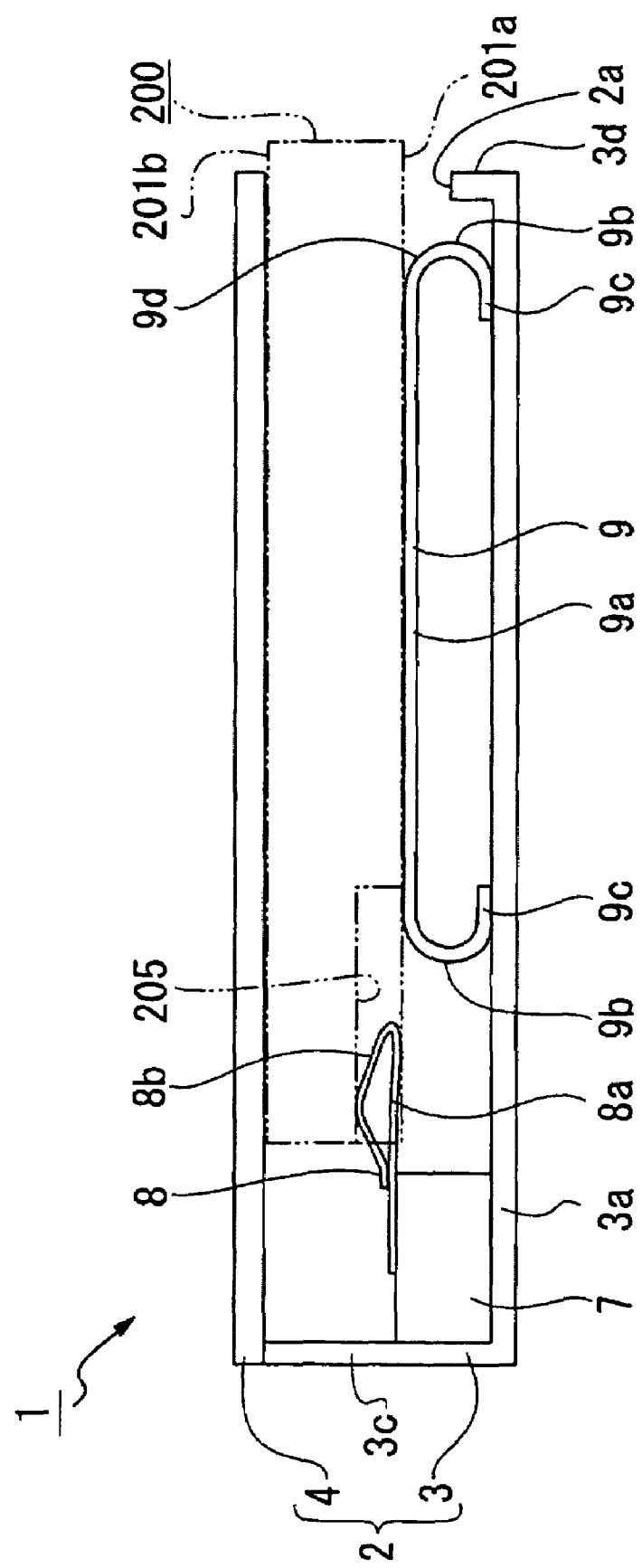
FIG. 11 is a schematic side view of the second card when the card insertion is completed.

As shown in FIG. 11, when the second card 200 moves rearward, the spring sections 9b of the height adjuster 9 elastically deform to press the height-adjusting section 9a against the first main surface 201a of the second card 200. Accordingly, the height-adjusting section 9a is urged to the first main surface 201a such that the second card 200 is slidable, and the second main surface 201b is urged to the cover plate 4 such that the second card 200 is slidable. As a result, the second card 200 is positioned appropriately in the thickness direction while the second card 200 moves rearward.

Figure 12:
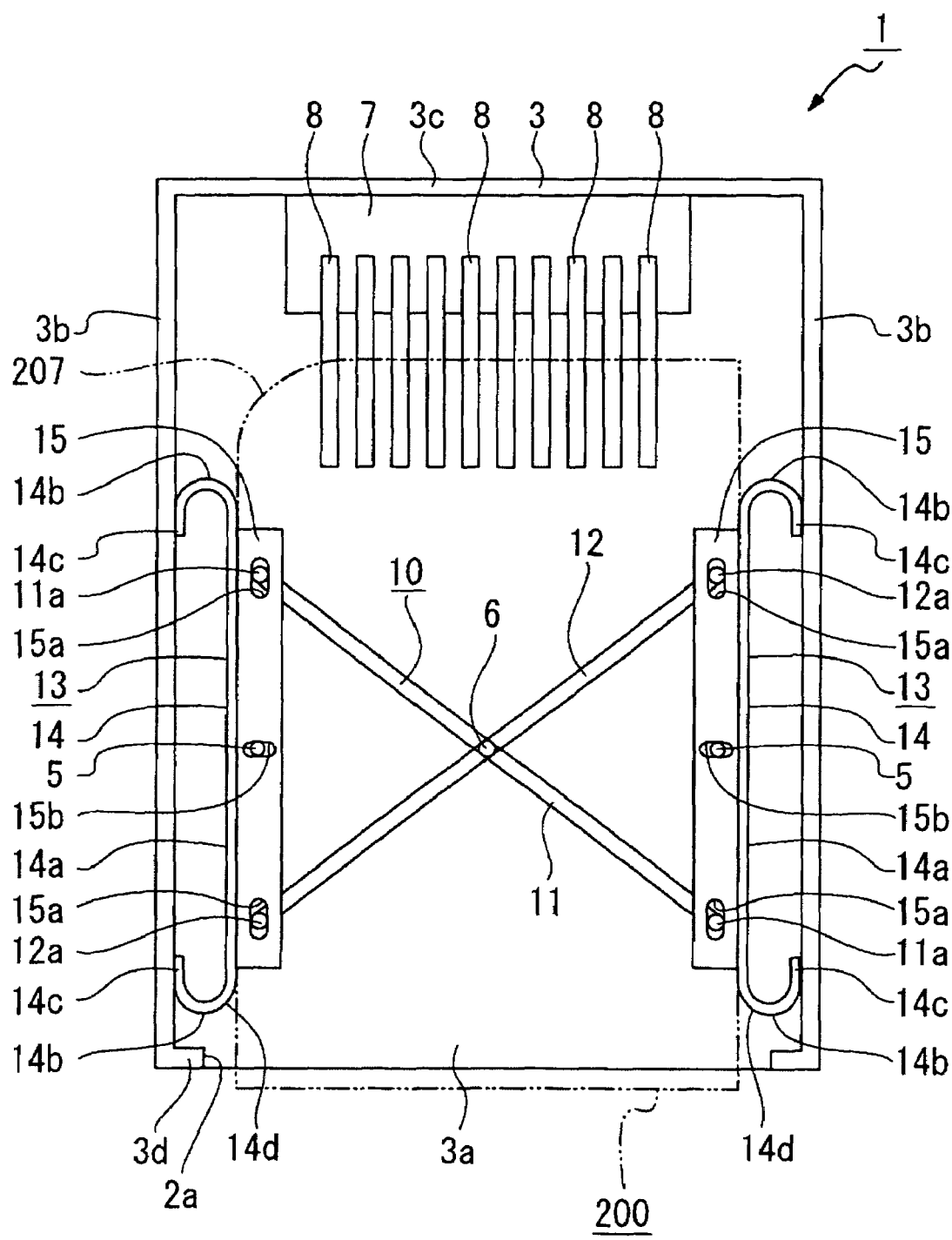
FIG. 12 is a schematic plan view of the second card when the card insertion is completed.

At the same time, as shown in FIG. 12, the spring sections 14b of the width adjusters 13 elastically deform to press the width-adjusting sections 14a against the respective side faces 201c of the second card 200. Accordingly, the width-adjusting sections 14a are urged to the respective side faces 201c such that the second card 200 is slidable. As a result, the second card 200 is appropriately positioned in the width direction while the second card 200 moves rearward. At this time, the width-adjusting portions 14 of the width adjusters 13 are disposed remotely from the supporting pin 6 by the centering mechanism 10 such that the distances in the width direction between each of the width-adjusting portions 14 and the supporting pin 6 are the same. Thus, the second card 200 is centered.

As shown in FIG. 11, when the second card 200 further moves rearward, the terminal electrodes 205 are connected to the respective connecting terminals 8 lying ahead. Since the connecting terminals 8 are elastically deformable, the terminal electrodes 205 are elastically brought into contact with the contact section 8b. This ensures the secure connection between the terminal electrodes 205 and the connecting terminals 8.

The second card 200 can be ejected by, for example, holding part of the second card 200 protruding forward from the loading slot 2a and pulling the second card 200 out. When the second card 200 is ejected, the connecting terminals 8 restore to the original position (as shown in FIG. 7), and the height-adjusting section 9a and the width-adjusting sections 14a also restore to the original position (as shown in FIGS. 7 and 8) due to the restoration of the spring sections 9b of the height adjuster 9 and the spring sections 14b of the width adjusters 13.

As described above, the card-receiving device 1 includes the cover plate 4 and the height-adjusting section 9a. The second main surface 101b of the first card 100 or the second main surface 201b of the second card 200 is pressed against the cover plate 4, and the height-adjusting section 9a is pressed against the first main surface 101a and the first main surface 201a. The spring sections 9b bias the height-adjusting section 9a toward the cover plate 4. Accordingly, the thinner second card 200 can be loaded in the card-receiving device 1 in the same manner as the thicker first card 100 without attaching an adaptor to the second card 200. This improves the usability of the card-receiving device 1.

Also, the card-receiving device 1 includes the width-adjusting sections 14a. The respective side faces 101c of the first card 100 or the respective side faces 201c of the second card 200 are pressed against the width-adjusting section 14a. The spring sections 14b bias the width-adjusting sections 14a so as to move close to each other. The card-receiving device 1 further includes the centering mechanism 10 for centering the terminal electrodes 105 of the first card 100 and the terminal electrodes 205 of the second card 200 with respect to the connecting terminals 8 in the width direction. Accordingly, the narrower second card 200 can be loaded in the card-receiving device 1 in the same manner as the wider first card 100 without attaching an adaptor to the second card 200. This improves the usability of the card-receiving device 1.

Moreover, the first card 100 or the second card 200 is inserted into the same path and connected to the common connecting terminals 8. Accordingly, the usability of the card-receiving device 1 can be improved even with fewer numbers of parts and simplified mechanisms.

Further, the card-receiving device 1 includes guiding sections 9d and 14d for guiding the first card 100 or the second card 200 inserted from the loading slot 2a to the connecting terminals 8. Accordingly, the first card 100 or the second card 200 is guided reliably to the connecting terminals 8.

Furthermore, since the guiding section 9d and guiding sections 14d are integrated in the height adjuster 9 and the width adjusters 13, respectively, the number of parts can be reduced.

In addition, since the spring sections 9b functioning as the biasing means of the height adjuster 9 and the spring sections 14b functioning as the biasing means of the width adjusters 13 are integrated in the height adjuster 9 and the width adjusters 13, respectively, the number of parts can be reduced.

In the above-described embodiment, two cards having different outer dimensions are loaded. However, the number of loadable cards is not limited to two, and the present invention is applicable to the case in which three or more cards having different outer dimensions are loaded.

When a card has an electrode portion with a fixed width (Hx shown in FIG. 3) and the same intervals between terminal electrodes, and the difference between the distance from the right end of the electrode portion to the right end of the casing and the distance D11 and the difference between the distance from the left end of the electrode portion to the left end of the casing and the distance D12 are the same, the card is loadable in the card-receiving device 1.

The profiles and the structures of the components shown in the above-described preferred embodiment are merely examples for carrying out the present invention, and the technical scope of the present invention should not be narrowly interpreted according to the embodiment.

What is claimed is:

1. A card-receiving device for receiving a card having a plurality of terminal electrodes at an end in the insertion direction, comprising:
    a loading slot for the card;
    a plurality of connecting terminals respectively connected to the terminal electrodes of the card;
    a reference plane, one surface of the card in the thickness direction being pressed against the reference plane;
    a height-adjusting section pressed against the other surface of the card in the thickness direction; and
    first biasing means for biasing the height-adjusting section toward the reference plane, and further comprising:
    a pair of width-adjusting sections pressed against respective side faces of the card in the width direction orthogonal to both the thickness direction and the insertion direction of the card;
    second biasing means for biasing the width-adjusting sections so as to be close to each other; and
    positioning means for positioning the terminal electrodes of the card with respect to the connecting terminals in the width direction.

2. The device according to claim 1, further comprising:
    a guiding section extending from the height-adjusting section for guiding the inserted card from the loading slot toward the connecting terminals.

3. The device according to claim 1, further comprising:
    a guiding section extending from each of the width-adjusting sections for guiding the inserted card from the loading slot toward the connecting terminals.

4. The device according to claim 1, wherein the height-adjusting section and the first biasing means are integrated together.

5. The device according to claim 1, wherein the width-adjusting sections and the second biasing means are integrated together.

6. A card-receiving device for receiving a card having a plurality of terminal electrodes at an end in the insertion direction, comprising:

a loading slot for the card;

a plurality of connecting terminals respectively connected to the terminal electrodes of the card;

a pair of width-adjusting sections pressed against respective side faces of the card in the width direction orthogonal to both the thickness direction and the insertion direction of the card;

second biasing means for biasing the width-adjusting sections so as to be close to each other; and positioning means for positioning the terminal electrodes of the card with respect to the connecting terminals in the width direction, and further comprising:

a reference plane, one surface of the card in the thickness direction being pressed against the reference plane;

a height-adjusting section pressed against the other surface of the card in the thickness direction; and first biasing means for biasing the height-adjusting section toward the reference plane.

7. The device according to claim 6, further comprising:

a guiding section extending from each of the width-adjusting sections for guiding the inserted card from the loading slot toward the connecting terminals.

8. The device according to claim 6, further comprising:

a guiding section extending from the height-adjusting section for guiding the inserted card from the loading slot toward the connecting terminals.

9. The device according to claim 6, wherein the width-adjusting sections and the second biasing means are integrated together.

10. The device according to claim 6, wherein the height-adjusting section and the first biasing means are integrated together.

* * * * *